United States Patent [19]

Jabalpurwala et al.

[11] 3,897,248

[45] July 29, 1975

[54] PRODUCTION OF PHOTOCONDUCTIVE ZINC OXIDE

[75] Inventors: Kaizer Esufali Jabalpurwala, St. Lambert; Henryk Malinowski, LaSalle, both of Canada

[73] Assignee: Zochem Limited

[22] Filed: May 2, 1973

[21] Appl. No.: 356,484

[30] Foreign Application Priority Data
May 5, 1972 United Kingdom............... 21049/72

[52] U.S. Cl....................... 96/1.8; 252/501; 423/512
[51] Int. Cl.²........................................... G03G 5/08
[58] Field of Search...................... 96/1.8; 252/501

[56] References Cited
UNITED STATES PATENTS

| | | | |
|---|---|---|---|
| 2,408,475 | 10/1946 | Nickle................ | 96/1.8 X |
| 2,624,857 | 1/1953 | Mager................ | 96/1.8 X |
| 2,970,285 | 1/1961 | Lasser et al.......... | 252/501 X |
| 3,060,134 | 10/1962 | Elder et al.......... | 252/501 |
| 3,116,260 | 12/1963 | Stern et al.......... | 252/501 |
| 3,197,307 | 7/1965 | Blake et al.......... | 252/501 X |

FOREIGN PATENTS OR APPLICATIONS

| | | | |
|---|---|---|---|
| 41-16427 | 9/1966 | Japan.................. | 96/1.8 |
| 44-23982 | 10/1969 | Japan.................. | 96/1.8 |
| 41-16428 | 9/1966 | Japan.................. | 96/1.8 |
| 44-23983 | 10/1969 | Japan.................. | 96/1.8 |
| 907,909 | 10/1962 | United Kingdom... | 96/1.8 |
| 1,215,685 | 12/1970 | United Kingdom... | 96/1.8 |

OTHER PUBLICATIONS

Cotton and Wilkinson, *Advanced Inorganic Chemistry*, 1966, pp. 519–525 and 600–606.

*Primary Examiner*—Norman G. Torchin
*Assistant Examiner*—John R. Miller

[57] ABSTRACT

The electrophotographic properties of photoconductive zinc oxide are improved by blending the zinc oxide with a sulphurizing agent in powder, liquid or gaseous form tempering the blend at a temperature in the approximate range 500° to 950°C. for a time of 10 seconds to 3 hours, and rapidly cooling to room temperature.

11 Claims, No Drawings

PRODUCTION OF PHOTOCONDUCTIVE ZINC OXIDE

This invention relates to the production of photoconductive zinc oxide having improved electrophotographic properties.

Photoconductive zinc oxide is used in the production of sensitized paper for use in photocopying. In the formulation of a satisfactory electrophotographic paper coating material there are certin performance characteristics to be considered. Such a coating must be capable of accepting a high electrostatic charge and of retaining the charge over reasonably long intervals, must be capable of losing the charge very rapidly on exposure to light, and must leave little or no charge on the areas which have been exposed. Thus the electrophotographic properties of such a coating material, which determine its suitability for use in photocopying, depend upon the charge acceptance, dark decay, light decay, and residual charge characteristics of the material.

The present invention is based on the discovery that the electrophotographic properties of photoconductive zinc oxide can be improved considerably by treating the oxide with sulphur or a sulphur-bearing compound.

Basically, the process of the present invention comprises selecting a high grade photoconductive zinc oxide powder, which may have been prepared by the French process or the American process, for example, thoroughly blending the zinc oxide powder with a sulphurizing agent, such as flowers of sulphur or a sulphur-bearing compound, in powder, liquid or gaseous form, tempering the blend at a temperature in the approximate range of 500° to 950°C. and for a time of 10 seconds to 3 hours, and rapidly cooling to room temperature (20°C). The term "sulphurizing agent" is used herein to mean elemental sulphur or a sulphur bearing compound which at the tempering temperature reacts with the zinc oxide to form at least one of the species $ZnO.ZnSO_3$, $ZnO.ZnSO_4$ and $ZnO.ZnSO_3.ZnSO_4$. When the improved photoconductive zinc oxide of the present invention is dissolved in very dilute hydrochloric acid and immediately tested for sulphite and sulphate using barium chloride solution, slow precipitation of barium sulphate indicates possible existence of the sulphite along with the sulphate.

When flowers of sulphur are used, the concentration of sulphur, i.e. the proportion of sulphur to be added, should be in the range from 0.005% to about 0.5% by weight of zinc oxide. The optimum sulphur concentration has been found to be about 0.01% by weight. However, sulphur dioxide, sulphuric acid, and solid sulphur-bearing compounds in powder form may alternatively be used, and in these cases the effective concentrations of the sulphur bearing compounds, measured in terms of their sulphur content, should be in the range 0.005%–0.01% by weight of zinc oxide.

The temperature and time of the tempering process are interdependent, the limits of the range being a tempering time of 10 seconds at 950°C. and a tempering time of 3 hours at 500°C. This is the useful tempering range; however, the optimum temperature depends upon the physical characteristics of the selected zinc oxide and the optimum tempering time depends upon the selected temperature. For a given temperature the tempering time must be sufficient for there to be a reaction in the zinc oxide-sulphur system, but must not be so long as to result in sintering or partial sintering of the product. In a case in which 0.01% by weight of powdered sulphur was added to a quantity of zinc oxide produced by the French process, the admixture being tempered in air while being continuously blended during tempering, optimum results were obtained when the tempering time was 90 minutes and the temperature 525°C. However, if the zinc oxide had had a larger average particle size a tempering time of less than 90 minutes would have been necessary for optimum results.

As to the sulphur bearing compounds, powdered sulphur, sulphur dioxide, and sulphuric acid have been used successfully, as have also solid compounds such as zinc sulphate. Experiments carried out strongly suggest that the improvement of the zinc oxide results from complex species involving $ZnO.ZnSO_3$; $ZnO.ZnSO_4$; or $ZnO.ZnSO_3.ZnSO_4$.

The modified product, after tempering, should be cooled to room temperature as rapidly as possible, for example over a period of 90 minutes; for this purpose a water-jacketed screw conveyor is found most suitable. The product may alternatively be air-cooled.

In each of the following examples, which are merely illustrative of the process, the starting material is a photoconductive zinc oxide having at least a useful photosensitivity. The term "photosensitivity" is arbitrarily defined as the ability of the zinc oxide when incorporated in a photocopying system with sensitizers to lose a certain percentage of an applied electrostatic charge when subjected to a light pulse of 2 foot candles for 2 seconds.

EXAMPLE 1

200 grammes of zinc oxide having a photosensitivity of 25% were mixed with 0.02 grammes of sulphur powder in a "Vycor" dish. The dish was then placed in an electrically heated muffle furnace maintained at a temperature of 550°C. At 15 minute intervals the dish was quickly turned over, and the tempering was continued for 90 minutes. At the end of this period the dish was taken out of the furnace and was allowed to cool to room temperature. The resultant powder was next applied as a coating on a conductive base paper sheet, and was tested on a Victoreen EPA-825 electrostatic paper analyzer; its photosensitivity was found to be 97%.

A sample of the starting zinc oxide was treated in exactly the same way, but without the addition of sulphur powder, and its photosensitivity was found to be 55%.

EXAMPLE 2

200 grammes of zinc oxide having a photosensitivity of 25% were treated with a carefully controlled quantity of $SO_2$ gas added gradually, vigorous mixing taking place for 2 minutes. The amount of $SO_2$ gas added corresponded to a sulphur concentration of 0.01% by weight of ZnO — that is to say, the weight of $SO_2$ gas added was 0.04 grammes. The treated zinc oxide was then tempered in a muffle furnace at a temperature of 550°C and for a period of 90 minutes, the powder being stirred every 15 minutes. After tempering the powder was cooled to room temperature and was tested in the manner described in Example 1. The photosensitivity of the product was found to be 96%.

EXAMPLE 3

200 grammes of zinc oxide having a photosensitivity of 25% were mixed with powdered zinc sulphate corresponding, in terms of sulphur content, to 0.01% by weight of the zinc oxide. The mixture was then tempered in a muffle furnace at a temperature of 550°C for a period of 60 minutes. After cooling the product was found to have a photosensitivity of 90%.

EXAMPLE 4

During the course of production of zinc oxide having a photosensitivity of approximately 25%, a 2.2 normal solution of sulphuric acid was sprayed in the flame of zinc oxide; this represented an addition to the zinc oxide of 0.011% sulphur by weight. A quantity of this treated oxide was then tempered at 550°C for 90 minutes in a muffle furnace, and after cooling was found to have a photosensitivity of 91%.

EXAMPLE 5

The process was carried out under the conditions described in Example 1, except that the muffle furnace was maintained at a temperature 950°C and the tempering time was 10 seconds. When tested, by the method described in Example 1, the photosensitivity of the oxide was found to be 99.5%.

EXAMPLE 6

The process described in Example 1 was repeated with the tempering being carried out at 500°C for 3 hours. In this case the photosensitivity of the product was found to be 65%.

EXAMPLE 7

The process described in Example 1 was repeated with the addition of sulphur being in the proportion 0.04% by weight. The product was found to have an improved sensitivity of 85%.

The product was of the process described in each of these examples is a photoconductive zinc oxide of greatly increased photosensitivity.

We claim:

1. A process for improving the electrophotographic properties of photoconductive zinc oxide powder, comprising the steps of thoroughly blending the zinc oxide powder with a sulphurizing agent in powder, liquid or gaseous form, the sulphurizing agent being incorporated in a concentration, measured in terms of sulphur content, in the approximate range 0.005% to 0.5% by weight of zinc oxide, tempering the blend in an oxidizing atmosphere at a temperature in the approximate range 500° to 950°C. at which oxidation of the sulphurizing agent will take place, and for a period within the range 10 seconds to 3 hours, and rapidly cooling to room temperature (20°C.).

2. A process according to claim 1, wherein the sulphurizing agent consists of flowers of sulphur added to the zinc oxide in a proportion in the approximate range 0.005% to 0.5% by weight of zinc oxide.

3. A process according to claim 2, wherein the flowers of sulphur are added to the zinc oxide in a concentration of about 0.01% by weight of zinc oxide.

4. A process according to claim 1, wherein the sulphurizing agent is sulphur dioxide added to the zinc oxide in a concentration, measured in terms of its sulphur content, in the range 0.005% to 0.01% by weight of zinc oxide.

5. A process according to claim 4, wherein the sulphur dioxide is added to the zinc oxide in a concentration, measured in terms of its sulphur content, of about 0.01% by weight of zinc oxide.

6. A process according to claim 1, wherein the sulphurizing agent is sulphuric acid added to the zinc oxide in a concentration, measured in terms of its sulphur content, in the range 0.005% to 0.01% by weight of zinc oxide.

7. A process according to claim 6, wherein the sulphuric acid is added to the zinc oxide in a concentration, measured in terms of its sulphur content, of about 0.011% by weight of the zinc oxide.

8. A process according to claim 1, wherein the sulphurizing agent is zinc sulphate added to the zinc oxide in a concentration, measured in terms of its sulphur content, in the range 0.005% to 0.01% by weight of zinc oxide.

9. A process according to claim 8, wherein the zinc sulphate is added to the zinc oxide in a concentration, measured in terms of its sulphur content, of about 0.01% by weight of the zinc oxide.

10. A process according to claim 1, wherein the blend is tempered for a period of approximately 90 minutes at a temperature of approximately 550°C.

11. A photoconductive zinc oxide power having improved electrophotographic properties, characterized by the presence of at least one of the species $ZnO.ZnSO_3$, $ZnO.ZnSO_4$ and $ZnO.ZnSO_3.ZnSO_4$, when produced by the process of claim 1.

* * * * *